US008109358B2

(12) United States Patent
Dayton

(10) Patent No.: US 8,109,358 B2
(45) Date of Patent: Feb. 7, 2012

(54) ELECTRONICALLY CONTROLLED LOCKING DIFFERENTIAL HAVING UNDER-DASH CONTROL SYSTEM

(75) Inventor: Terry Andrew Dayton, Battle Creek, MI (US)

(73) Assignee: Eaton Corporation, Southfield, MI (US)

( * ) Notice: Subject to any disclaimer, the term of this patent is extended or adjusted under 35 U.S.C. 154(b) by 444 days.

(21) Appl. No.: 12/468,914

(22) Filed: May 20, 2009

(65) Prior Publication Data

US 2010/0298083 A1 Nov. 25, 2010

(51) Int. Cl.
*B60K 17/00* (2006.01)
(52) U.S. Cl. .............................. 180/336; 701/51; 701/52
(58) Field of Classification Search .................. 180/336; 701/51, 52
See application file for complete search history.

(56) References Cited

U.S. PATENT DOCUMENTS

| | | | | |
|---|---|---|---|---|
| 3,640,156 | A | * | 2/1972 | Mori et al. ....................... 477/93 |
| 4,754,835 | A | | 7/1988 | Stelter et al. ................... 180/248 |
| 5,043,892 | A | * | 8/1991 | Brekkestran et al. ........... 701/51 |
| 5,130,657 | A | | 7/1992 | Hornung ......................... 324/415 |
| 5,152,191 | A | * | 10/1992 | Sato et al. ........................ 477/36 |
| 5,737,712 | A | * | 4/1998 | Han et al. ......................... 701/51 |
| 5,964,675 | A | * | 10/1999 | Shimada et al. .............. 475/123 |
| 6,083,134 | A | | 7/2000 | Godlew ......................... 475/231 |
| 6,292,732 | B1 | * | 9/2001 | Steinmetz et al. .............. 701/67 |
| 6,309,321 | B1 | | 10/2001 | Valente ......................... 475/249 |
| 6,551,209 | B2 | | 4/2003 | Cheadle et al. ................ 475/150 |
| 6,609,357 | B1 | | 8/2003 | Davis et al. ................. 56/10.2 A |
| 7,162,346 | B2 | | 1/2007 | Berry et al. ...................... 701/48 |
| 7,225,704 | B2 | * | 6/2007 | Ishii et al. ................... 74/606 R |
| 7,264,569 | B2 | | 9/2007 | Fox ................................ 475/241 |
| 7,532,968 | B2 | * | 5/2009 | Kadota ............................ 701/55 |
| 7,546,196 | B2 | * | 6/2009 | Izumi et al. ..................... 701/51 |
| 7,811,188 | B2 | * | 10/2010 | Brown ............................ 474/43 |
| 2004/0093974 | A1 | | 5/2004 | Nesseth ..................... 74/473.12 |
| 2007/0142155 | A1 | | 6/2007 | Schumacher ................. 475/150 |
| 2008/0116896 | A1 | | 5/2008 | Skinner ......................... 324/418 |

FOREIGN PATENT DOCUMENTS

| | | |
|---|---|---|
| EP | 1 300 279 A2 | 4/2003 |
| WO | WO 03/070507 A1 | 8/2003 |

* cited by examiner

*Primary Examiner* — Toan To
(74) *Attorney, Agent, or Firm* — Bliss McGlynn, P.C.

(57) ABSTRACT

An electronically controlled locking differential includes an electromagnetic coil and a control system adapted to control operation of the differential. The control system has a module adapted to be mounted under a dashboard of a vehicle and a circuit electrically interfacing with the module. The circuit has a latching switch that is electrically connected to first and/or second sources of power and adapted to provide latching power of the differential. A latching component is electrically connected to the latching switch and adapted to provide latching power of the differential. The circuit is disabled when power to the control system is turned off and in "standby" mode when power to the control system is turned on. Upon the latching switch being activated, current flows through the circuit to activate the latching component, and the differential is actuated.

20 Claims, 4 Drawing Sheets

ELECTRONICALLY CONTROLLED LOCKING DIFFERENTIAL HAVING UNDER-DASH CONTROL SYSTEM

BACKGROUND OF THE INVENTION

1. Field of the Invention

The present invention relates, in general, to electronically controlled locking differentials and, in particular, to an electronically controlled locking differential having an under-dash system adapted to control operation of the differential.

2. Description of the Related Art

In automotive applications, an electronically controlled locking differential of the related art may be actuated either manually and is designed expressly for a four-wheel-drive (4WD) vehicle to allow the differential to be locked or unlocked when it is so desired. The driver can lock the front and/or rear wheels by manually activating a switch or button mounted to a dashboard or console of the vehicle. This type of torque-controlling device is well-known in the aftermarket. More specifically, an aftermarket system including the differential can be installed using a large push-button switch, which is adapted to be mounted to the dashboard, wire harness, relay, and routing wires.

However, installation of this type of differential into the 4WD vehicle typically requires drilling or boring a hole through the dashboard to mount the relay, route wires, and install the switch that activates and deactivates the differential. Several disadvantages are associated with this installation. In particular, this installation is time-consuming and complicated by requiring modification of the dashboard and complicated wiring. In addition, improper drilling or boring can damage the dashboard, negatively affect the aesthetics of the vehicle interior, and increase cost and time of the installation.

Thus, there is a need in the related art for an electronically actuated locking differential that provides control, power, traction, and off-road performance to a 4WD vehicle. There is also a need in the related art for such a differential where installation does not require drilling or boring a hole into and through a dashboard of the 4WD vehicle. There is also a need in the related art for such a differential where installation of the controls is not time-consuming, complicated, and costly and does not damage the dashboard. There is also a need in the related art for such a differential that prevents actuation when 4WD functionality is not necessary. There is also a need in the related art for such a differential that helps provide longer life to the battery of the vehicle. In particular, there is a need in the related art for an aftermarket electronically actuated locking differential system that incorporates these features.

SUMMARY OF THE INVENTION

The present invention overcomes the disadvantages in the related art in an electronically controlled locking differential that includes an electromagnetic coil and a control system adapted to control operation of the differential. The control system has a module adapted to be mounted under a dashboard of a vehicle and a circuit electrically interfacing with the module. The circuit has a latching switch that is electrically connected to first and/or second sources of power and adapted to provide latching power of the differential. A latching component is electrically connected to the latching switch and adapted to provide latching power of the differential. The circuit is disabled when power to the control system is turned off and in "standby" mode when power to the control system is turned on. Upon the latching switch being activated, current flows through the circuit to activate the latching component, and the differential is actuated.

The electronically controlled locking differential of the present invention provides control, power, traction, and off-road performance to a 4WD vehicle. Installation of the control system does not require drilling or boring a hole through a dashboard of the 4WD vehicle; is not time-consuming, complicated, or costly; and does not damage the dashboard. The control system also integrates various controls into an efficient package and provides more safety and better control and feedback of status of the differential relative to such systems of the related art. Furthermore, momentary "on/off" latching and drop-out power of the differential is controlled. In addition, actuation of the differential is prevented when 4WD functionality of the vehicle is not desired. In this way, premature wear of the differential and related parts and an axle and corresponding tires of the 4WD vehicle is avoided. Moreover, since the differential resets when power to the 4WD vehicle is turned off, the differential helps provide longer life to a battery of the vehicle. The control system can be a part of an aftermarket electronically actuated locking differential system and employed with OEM applications as well.

Other objects, features, and advantages of the present invention are readily appreciated as the same becomes better understood while reading the subsequent description taken in conjunction with the accompanying drawings.

BRIEF DESCRIPTION OF EACH FIGURE OF THE DRAWINGS

DETAILED DESCRIPTION OF EMBODIMENTS OF THE INVENTION

Figure 1:
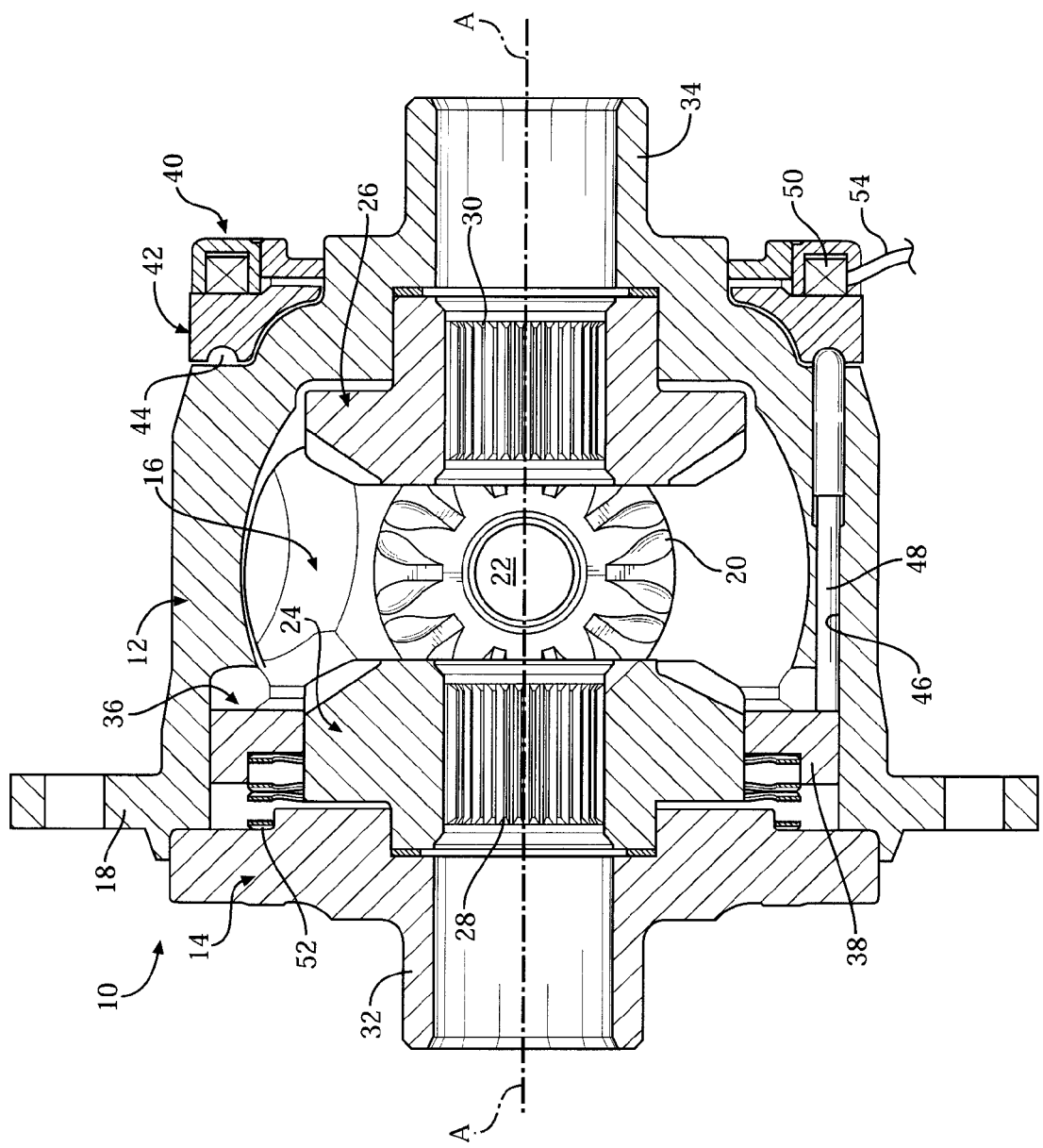
FIG. 1 is an axial cross-sectional view of an electronically controlled locking differential of the present invention showing the differential in its actuated, locked mode.
Figure 2:
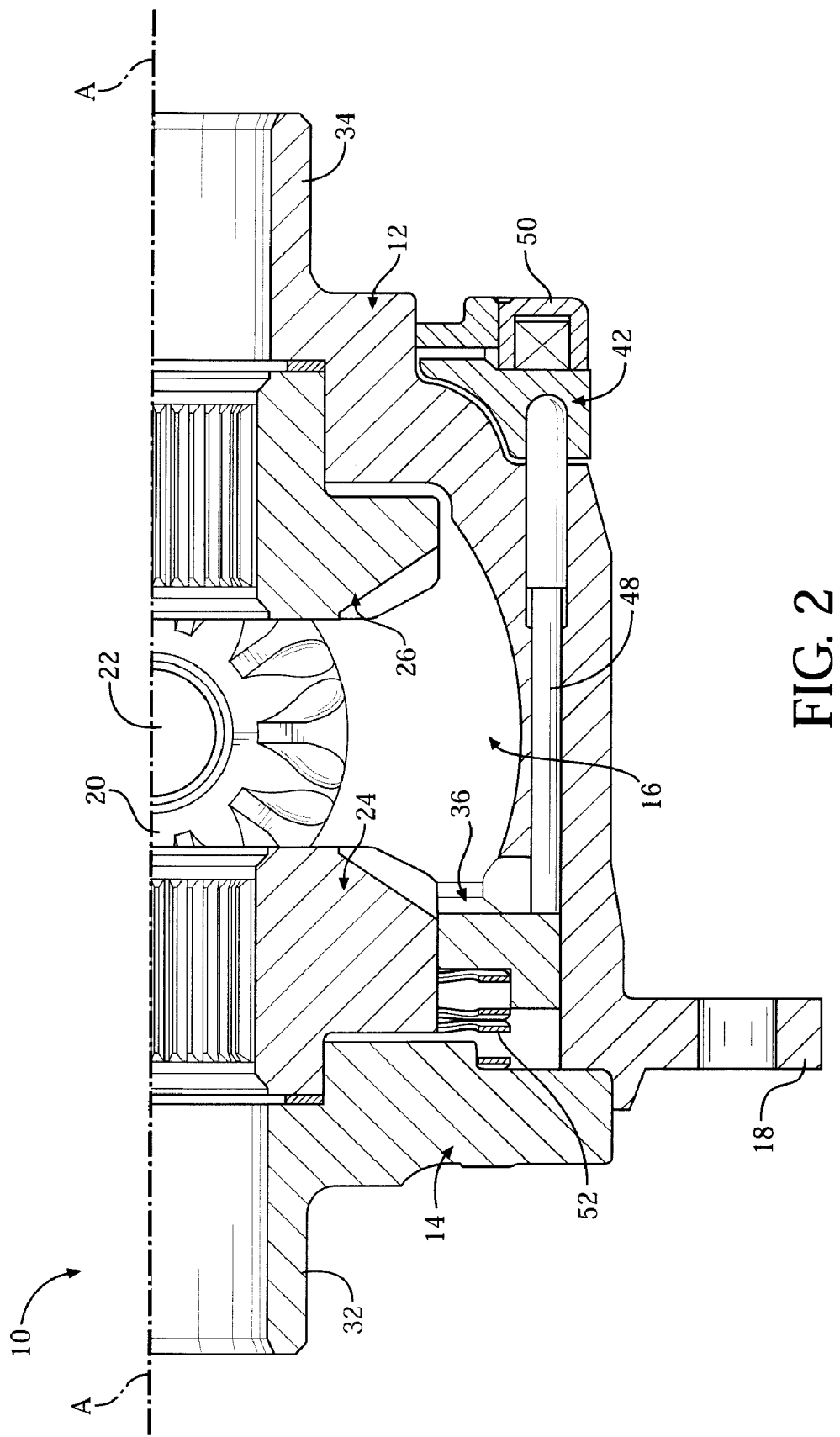
FIG. 2 is an enlarged fragmentary axial cross-sectional view of the differential illustrated in FIG. 1 showing the differential in its non-actuated, unlocked mode.

Referring now to the figures, where like numerals are used to designate like structure, one embodiment of an electronically controlled locking differential having an under-dash control system of the present invention is generally indicated at 10. It should be appreciated by those having ordinary skill in the related art that the differential 10 can be employed in 4WD vehicles, in particular, and any suitable vehicles, in general. It should also be appreciated that the control system of the present invention can be employed with any suitable electronically controlled locking differential. The one described below and shown in FIGS. 1 and 2 is only exemplary, and the control system can be employed with an electronically controlled locking differential that is structurally and functionally different than this one. It should also be appreciated that the control system can be employed by an OEM or in the aftermarket. In the latter case, the control system is adapted to be mounted under the dashboard of a 4WD vehicle and is only part of an installation kit that can include a wire harness, relay, and routing wires and is commonly known in the related art. Those having ordinary skill in the related art should be able to install the differential to the 4WD vehicle using just the kit and necessary tools.

As shown in FIGS. 1 and 2, the differential 10 includes a gear case, generally indicated at 12, and an end cap, generally indicated at 14, which may be fastened to the gear case 12 by any suitable fastener, such as by a plurality of bolts (not shown). The gear case 12 and end cap 14 cooperate with each other to define a gear chamber, generally indicated at 16. Torque input to the differential 10 is typically by an input ring gear (not shown), which may be attached to a flange 18 as is commonly known in the related art. A gear set is supported within the gear chamber 16 and has at least a pair of input pinion gears 20 (only one of which is shown). The pinion gears 20 are mounted rotatably about a pinion shaft 22 that is secured relative to the gear case 12 by any suitable means. The pinion gears 20 are input gears of the gear set and disposed in meshing engagement with a respective pair of left and right side gears, generally indicated at 24, 26. The side gears 24, 26 define respective sets of internal, straight splines 28, 30 that are adapted to be in splined engagement with mating external splines on a respective pair of left and right axle shafts (not shown). The gear case 12 defines annular hub portions 32, 34 on which may be mounted a respective pair of bearing sets that are used to provide rotational support for the rotating differential 10 relative to an outer housing or carrier as is commonly known in the related art.

A rotation-prevention mechanism, generally indicated at 36, has a generally annular collar member 38 and is disposed entirely within the gear case 12 and operably associated with side gear 24 (the first output gear). An actuator, generally indicated at 40, is disposed primarily external to the gear case 12. More specifically, the actuator 40 is disposed at the end of and about the gear case 12 adjacent side gear 26 (the second output gear) and has a single ramp plate, generally indicated at 42, that defines a plurality of ramp surfaces 44. The gear case 12 defines a plurality of cylindrical openings 46 within each of which is slidably disposed an elongated, generally cylindrical actuation member 48. There is one ramp surface 44 for each actuation member 48. A locking mechanism of the differential 10 includes the collar member 38 and actuation members 48. The actuator 40 also has an electromagnetic coil, generally indicated at 50, that exerts a required retarding torque on the ramp plate 42, thus initiating ramp-up of the actuation members 48. The collar member 38 is biased toward the non-actuated, "unlocked" mode by a wave spring 52. The electromagnetic coil 50 is energized by a pair of electrical leads 54.

During normal, straight-ahead operation of a vehicle, no differentiation occurs between the left and right axle shafts or side gears 24, 26. Therefore, the pinion gears 20 do not rotate relative to the pinion shaft 22. As a result, the gear case 12, pinion gears 20, and side gears 24, 26 all rotate about an axis of rotation "A" as if the gear case 12, pinion gears 20, and side gears 24, 26 are a solid unit.

The differential 10 may be controlled manually, wherein a driver of the vehicle manually selects "locked" mode (rather than "unlocked" mode) to operate the differential 10. For example, when, say, the vehicle is at rest, the driver simply manually activates a switch or button, such as a simple momentary-type "on/off" toggle or rocker switch or push button, mounted to the dashboard or a console of the vehicle. In this way, an electric circuit (which is described below) is closed, thereby providing current in the circuit and a lamp located in or near the toggle switch or push button to indicate to the driver that the differential is actuated. Current flows in the circuit and ultimately to the electromagnetic coil 50 of the differential 10. The differential 10 then operates in the "locked" mode when, for example, the vehicle is in first gear or reverse. In this way, the first output gear 24 is locked relative to the gear case 12, preventing any further differentiation between the first output gear 24 and gear case 12. FIG. 1 shows the differential 10 in its actuated, "locked" mode, and FIG. 2 shows the differential 10 in its non-actuated, "unlocked" mode.

Figure 3:
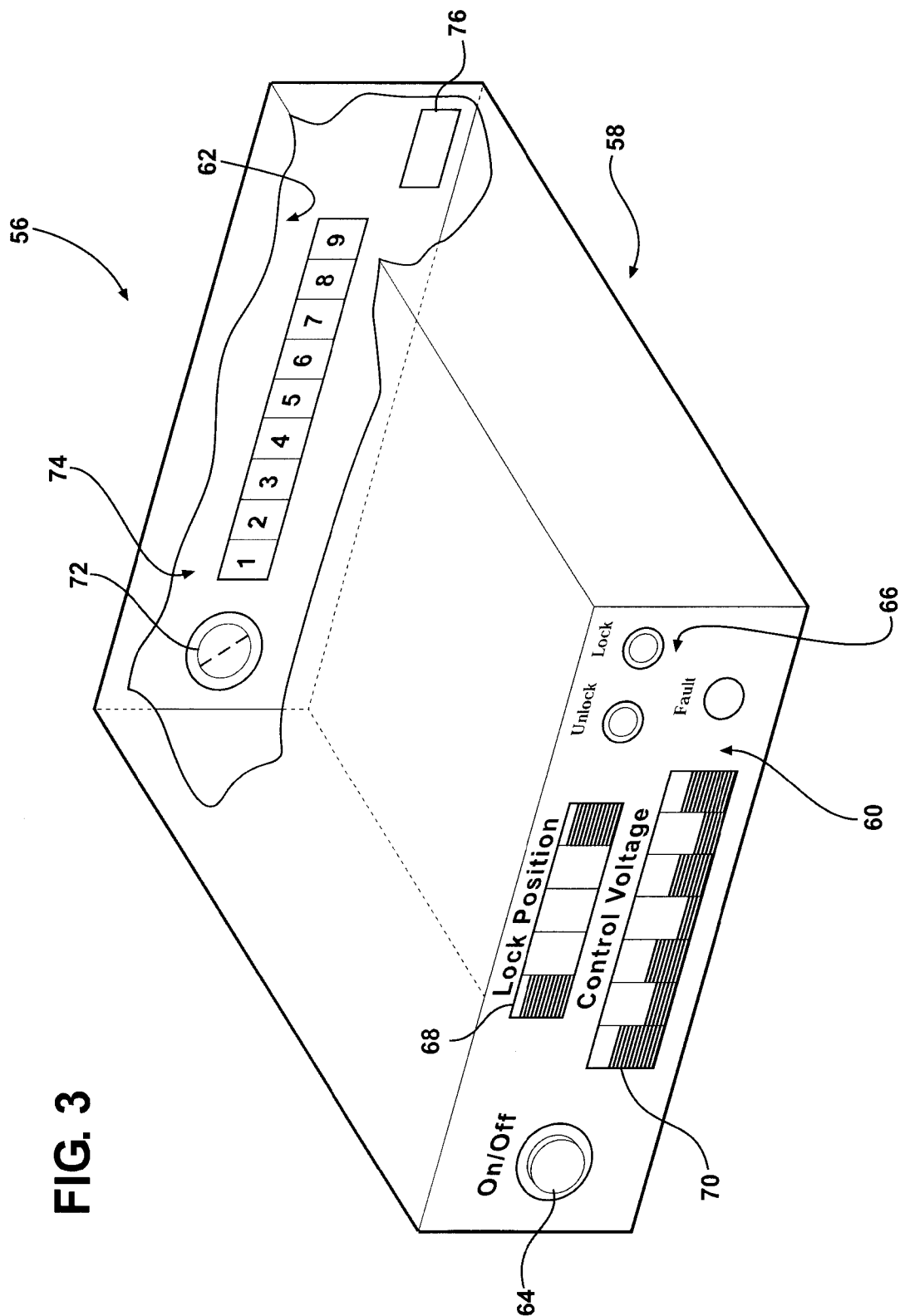
FIG. 3 is a perspective partial view of a module of a control system of the present invention that controls the electronically controlled locking differential illustrated in FIGS. 1 and 2.

FIG. 3 shows a part of a control system, generally indicated at 56, that is adapted to control operation of the differential 10. More specifically, the figure shows one embodiment of a module, generally indicated at 58, that is adapted to be mounted under the dashboard. In particular, the module 58 includes a front panel, generally indicated at 60, and a rear panel, generally indicated at 62. Upon installation of the module 58, the front panel 60 faces a passenger compartment of the 4WD vehicle. The driver and/or another passenger of a front seat of the vehicle have/has a view of the front panel 60 and manual access to both the front and rear panels 60, 62. In an embodiment of the module 58, rugged aluminum encloses the module 58.

The front panel 60 includes a soft-touch "on/off" or latching switch 64 that is adapted to be manually pushed to activate ("ON")/de-activate ("OFF") the differential 10 momentarily so as to provide latching power of the differential 10. The front panel 60 further includes a plurality of LEDs, generally indicated at 66, that are adapted to indicate when, respectively, a sensor detects that the differential 10 is locked ("Lock"), the sensor does not detect that the differential 10 is locked ("Unlock"), and the control system 56 detects an external fault (described below) or loss of continuity of the electromagnetic coil 50 of the differential 10 ("Fault"). In each case, the corresponding LED 66 is illuminated. The front panel 60 further includes a pair of multi-segmented bar-graph displays 68, 70 that indicate, respectively, amount of travel of the lock mechanism (the collar member 38 and actuation members 48) of the differential 10 and amount of variable voltage being applied to the electromagnetic coil 50. In the embodiment of the module 58 shown, bar-graph display 68 includes of five segments and is scaled at one volt per segment. Bar-graph display 70 includes of seven segments and is scaled at two volts per segment.

The rear panel 62 includes a potentiometer 72 that is adapted to hold a particular level of voltage for the differential 10 and be adjusted to various levels of potential. In the embodiment shown, the potentiometer is in the form of a dial 72. The rear panel 62 further includes a multi-pin connector, generally indicated at 74, that is adapted to act as an interface between the control system 56 and 4WD vehicle. In this way, excessive wiring of the vehicle is eliminated. In one embodiment of the module 58, the connector 74 can be a "Molex type" connector. In the embodiment of the module 58 shown, the connector 74 consists of nine pins each or a plurality of which is/are designed to sense a particular activity. For example, pins labeled "1," "2," and "3" can serve collectively as the sensor that detects the differential 10 being locked or unlocked ("Lock"/"Unlock"), pins labeled "4" and "5" can serve collectively as the sensor that detects the electromagnetic coil 50, pin labeled "6" can serve as the sensor that detects positive charge of a battery of the 4WD vehicle, pin labeled "7" can serve as the sensor that detects power of a switched ignition of the 4WD vehicle (described below), pin labeled "8" can serve as the sensor that detects negative charge of the battery, and pin labeled "9" can serve as the sensor that detects the external fault or loss of continuity of the electromagnetic coil 50 ("Fault"). The sensor in the differential 10 required to detect locking of the differential 10 can be a "Hall effect" sensor or simple dry-contact switch. The rear panel 62 further includes a fuse 76 that allows internal protection of wiring of the control system 56 in case of electrical shorts in a circuit of the control system 56 as will be described in greater detail below. In one embodiment, the fuse is a spade-style fuse 76.

Referring more specifically to detection of the external fault or loss of continuity of the electromagnetic coil 50, fault input is controlled by the dial 72 and can be of any suitable direct-current source—like a speed signal, pressure transducer, switch of a transmission of the vehicle, or digital output from an electronic control unit (ECU) of the vehicle. When a fault is detected, the module 58 switches to "standby" mode, and the "Fault" LED 66 is illuminated. By way of example, zero to five volts of direct current may be pre-set to equate to a speed of the 4WD vehicle of zero to fifty miles per hour, and the differential 10 may be pre-set to disengage when the speed of the vehicle exceeds twenty miles per hour. Therefore, if the differential 10 is activated and the speed of the vehicle exceeds the pre-set speed, the module 58 automatically shuts off and is not automatically reactivated until the speed of the vehicle returns to twenty miles per hour or slower. In this way, an external-fault input of, say, up to about five volts of direct current is used to remotely turn off the differential 10 using an external sensor. Also, if, for instance, the fault input is a signal from a computer of the vehicle and the ECU has detected a reason that the differential 10 should not be activated, then the "Fault" LED 66 remains illuminated and the control system 56 does not allow activation of the differential 10. Those having ordinary skill in the related art should appreciate that the fault input is optional and operation of the module 58 would be unaffected if the fault input were missing.

It should be appreciated by those having ordinary skill in the related art that the module 58 can be installed at any suitable location under the dashboard, in particular, and any suitable location of the passenger compartment, in general, and be enclosed by any suitable material. It should also be appreciated that the front panel 60 can include any suitable type of mechanism that is adapted to activate/de-activate the differential 10 and any suitable kind and number of indicators and/or displays. It should also be appreciated that each of the bar-graph displays 68, 70 can consist of any suitable number of segments and define any suitable scale. It should also be appreciated that the indicators 66 and/or displays 68, 70 can have any suitable structural relationship with each other and the front panel 60. It should also be appreciated that the rear panel 62 can include any suitable mechanisms that are adapted to, respectively, hold a particular level of voltage for the differential 10 and be adjusted to various levels of potential and act as an interface between the control system 56 and 4WD vehicle. It should also be appreciated that the connector 74 can be any suitable type of connector and consist of any suitable number of pins each or a plurality of which is/are designed to sense any particular suitable activity. It should also be appreciated that the fuse 76 can be any suitable type of fuse. It should also be appreciated that the dial 72, connector 74, and fuse of the rear panel 62 can have any suitable structural relationship with each other and the rear panel 62.

Figure 4:
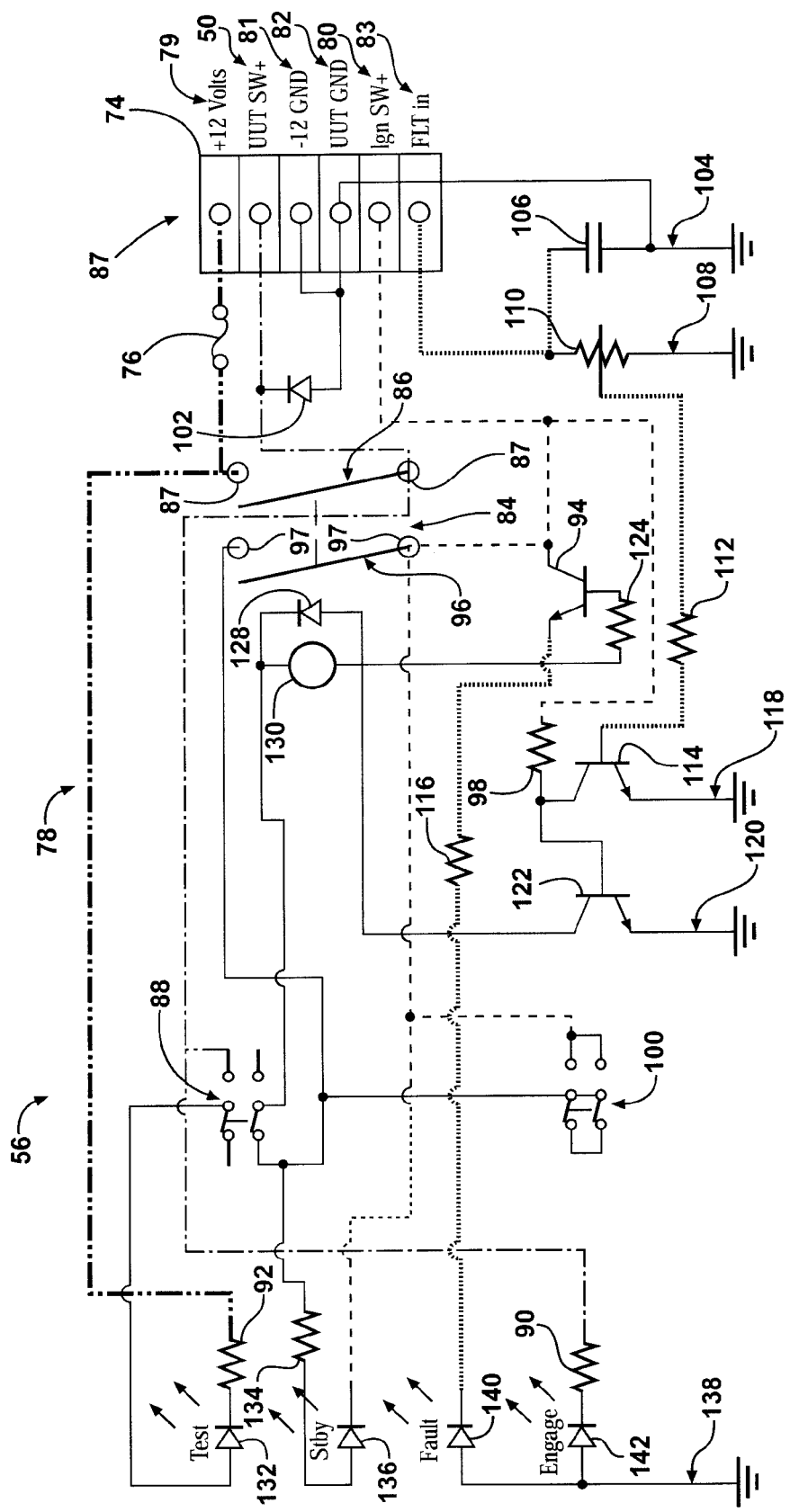
FIG. 4 is a schematic view of a circuit of the control system of the electronically controlled locking differential illustrated in FIGS. 1 and 2.

FIG. 4 depicts a circuit, generally represented at 78, of the control system 56 that electrically interfaces with the module 58. More specifically, the circuit 78 depicts the connector 74, in general, and electromagnetic coil 50 of the differential 10 as a "unit under test" switch line, in particular. In this way, the differential 10 is electrically connected to the control system 56. The circuit 78 also depicts a direct twelve-volt battery line, generally indicated at 79, of the 4WD vehicle and a twelve-volt switched-ignition line, generally indicated at 80, from a switched ignition of the vehicle as power sources. The circuit 78 also depicts a ground line, generally indicated at 81, a "unit under test" ground line, generally indicated at 82, and a fault line, generally indicated at 83. The circuit 78 delivers pulse-width-modulation (PWM) output. The high side of the circuit 78 controls damping and switching for activation while the low side of the circuit 78 controls driving and switching for faults. The figure shows different patterns for the respective lines of the circuit 78, and each line is described in detail immediately below.

The "unit under test" switch line 50 is electrically connected to a latching component, generally indicated at 84, in the form of a double-pole, double-throw control relay 84. More specifically, the "unit under test" switch line 50 is electrically connected to a first switch, generally indicated at 86, of the relay 84 that includes a set of contacts 87 for high current. The "unit under test" switch line 50 is also electrically connected to a self-test coil indicator/"off" switch, generally indicated at 88, and a resistor 90. The self-test coil indicator/"off" switch 88 ensures that the electromagnetic coil 50 is present, and the control system 56 can perform a periodic test to ensure that the electromagnetic coil 50 is present. The "unit under test" switch line 50 leads ultimately to engagement of the "Lock" LED 66.

The battery line 79 is electrically connected to the fuse 76 and a resistor 92. The switched-ignition line 80 is electrically connected to a transistor 94 and the relay 84. More specifically, the switched-ignition line 80 is electrically connected to a second switch, generally indicated at 96, of the relay 84 that includes a set of contacts 97 for low current. The switched-ignition line 80 is also electrically connected to a resistor 98 and an "on" switch 100.

Ground line 81 is electrically connected to "unit under test" ground line 82, which is electrically connected to an in-line diode 102, the "unit under test" switch line 50, and a further ground line, generally indicated at 104. Diode 102 is adapted to conduct current to the relay 84 and dampen a reverse-bias-voltage spike, and ground line 104 is electrically connected to a capacitor 106.

The fault line 83 is electrically connected to ground line 104 and a further ground line, generally indicated at 108, which is electrically connected to a resistor 110 that serves to adjust filter. The fault line 83 is also electrically connected to a resistor 112, transistor 94, another transistor 114, and another resistor 116. Transistor 114 is electrically connected to a ground line, generally indicated at 118. A ground line 120 is electrically connected to a transistor 122, ground line 118, resistor 98, and another resistor 124, which is electrically connected to transistor 94. Transistor 94 is adapted to transfer a current that is flowing through the circuit across resistor 124, toggle the "Fault" LED 66, and invert a signal. Transistor 114 transfers the current across resistor 112 to ground when the transistor is switched, and transistor 122 transfers the current across resistor 98.

Ground line 120 is also electrically connected to an in-line diode 128 and a "latching" coil 130, which is a part of the relay 84 and adapted to introduce a counter-EMF into the circuit 78 when current changes. Diode 128 is adapted to conduct current to the relay 84 and dampen a reverse-bias-voltage spike. Ground line 120 is also electrically connected to the second switch 96 of the relay 84, the "on" switch 100, the self-test coil indicator/"off" switch 88, a test diode 132 (which is electrically connected to resistor 92), another resistor 134, and a standby diode 136, which is electrically connected to the switched-ignition line 80. Resistors 90, 92, 134 are adapted to drop the amount of flow of current in the circuit 78 and protect the respective LEDs 66. A ground line 138 is electrically connected to a fault diode 140, which is electrically connected to the fault line 83, and an engage diode 142, which is electrically connected to resistor 90. Diodes 132, 136, 140, 142 are adapted to be electrically connected to the corresponding LEDs 66.

In the embodiment of the circuit 78 shown, each of resistors 90, 92, 134 may be a 1.2 kilo-ohm resistor, each of resistors 98, 110 may be a 1.0 kilo-ohm resistor, and each of resistors 112, 116, 124 may be a 470-ohm resistor. Each of diodes 102, 128 may be a "1N4004" diode. Transistor 94 may be a "NTE123A" transistor, transistor 114 may be a "2N3904" transistor, and transistor 122 may be a "2SD669A" transistor. The capacitor 106 may have a capacitance of 0.01 microfarads, and the relay 84 may be a "W92S7012-12" relay.

It should be appreciated by those having ordinary skill in the related art that the circuit 78 can be electrically connected to each of the differential 10, battery, and switched ignition by any suitable means. It should also be appreciated that the first and second switches 86, 96 can have any suitable relationship with each other. It should also be appreciated that each of resistors 90, 92, 98, 110, 112, 116, 124, 134 can be any suitable type of resistor and provide any suitable amount of resistance; each of diodes 102, 128 can be any suitable type of diode; each of transistors 94, 114, 122 can be any suitable type of transistor; the capacitor 106 can define any suitable amount of capacitance; and the relay 84 can be any suitable type of relay. It should also be appreciated that a path of flow of current through the circuit 78 can start at any suitable point of the circuit 78.

In operation, when ignition or key-switch power is off, all functions of the control system 56 are disabled, except for testing of the electromagnetic coil 50 of the differential 10. To test the electromagnetic coil 50, switch 64 is pushed to de-activate the differential 10. As a result, a loop is closed at, say, about ten milliamps of current to verify that the electromagnetic coil 50 is present. In turn, at least one of the bar-graph displays 68, 70 is illuminated, or a separate test lamp can be illuminated to show such presence. When ignition or key-switch power is on, the module 58 is in "standby" mode. A backlit button can be illuminated in a particular color to show that the module 58 is in this mode.

To turn on or provide latching power to the differential 10 when the module 58 is in the "standby" mode, switch 64 of the front panel 60 is pushed. As a result, full voltage is applied to the control system 56 by the battery of the 4WD vehicle, and the module 58 is in "engage" mode. In turn, the "Lock" LED 66 is illuminated (or the backlit button can be illuminated in a particular different color to show that the module 58 is in this mode). Bar-graph display 68 shows the amount of travel of the lock mechanism of the differential 10, and bar-graph display 70 shows the amount of "full" voltage being applied to the electromagnetic coil 50. Upon the connector 74 detecting that the differential 10 is locked, the voltage drops back to the particular level of voltage for the differential 10 held by the dial 72, which can be adjusted to various levels of potential. This level of voltage should vary depending upon the particular differential with which the control system 56 is employed and can be, for example, about one-third of the full voltage applied to the control system 56 by the battery, or, about four volts of direct current. Alternatively, the particular level of voltage for the differential 10 held by the dial 72 can be pre-programmed. Either way, current draw from the battery is reduced. In turn, bar-graph display 70 shows the amount of reduced "hold" voltage being applied to the electromagnetic coil 50. As the module 58 toggles from the "standby" to "engage" modes, applying voltage to the electromagnetic coil 50 and engaging and latching the differential 10, the "Unlock" and "Lock" LEDs 66 toggle with respect to each other.

To turn off the differential 10, switch 64 is pushed again. As a result, the switched-ignition line 80 places the module 58 in standby mode, thereby preventing activation of the differential 10 and drain of the battery when the 4WD vehicle is not in use. In turn, the "Unlock" LED 66 is illuminated, and bar-graph displays 68, 70 show that there is neither travel of the lock mechanism nor voltage being applied to the electromagnetic coil 50. If pin labeled "9" detects an external fault or loss of continuity of the electromagnetic coil 50, then the "Fault" LED 66 is illuminated such that activation of the differential 10 is not allowed unless and until the fault or loss is cleared. If ignition power is cycled, e.g., the vehicle is turned off and then turned back on later, the module 58 drops out power to the differential 10 when the vehicle is turned off, and the differential 10 is not powered again unless and until the differential 10 is reactivated. The control system 56 contains a high-side drop-out circuit 78. In this way, any in-line switch can be an external safety mechanism by which any interruption in the ignition power automatically shuts off the module 58. For example only and not by way of limitation, a limit switch of the transmission can serve as such mechanism such that it automatically shuts off the module 58 when it detects that the vehicle is operating in first gear or reverse.

Since the module 58 of the control system 56 is mounted under the dashboard of the 4WD vehicle and, thus, holes need not be drilled through the face of the dashboard of the vehicle, it should be appreciated by those having ordinary skill in the "vehicle design and manufacturing" art that the control system 56 overcomes the aforementioned disadvantages of such systems of the related art. The control system 56 also controls the differential 10 while providing safety features and updates of the status of the differential 10. Operation of the control system 56 is based upon an electronic momentary-switch-latching-relay system with feedback to detect locking of the differential 10 and then control of power consumption. The control system 56 also incorporates a PWM signal to activate and hold on the differential 10 and a high- and low-side drop-out circuit 78. The control system 56 also prevents accidental operation of the differential 10 and provides external safety inputs on the switched-ignition line 80. The control system 56 also features twelve-volt thirty-amp max switching (twelve-volt ten-amp max PWM switching), switched-ignition high-side-fault drop-out, variable direct-current-fault input (less than about a ten-milliamp draw), and variable direct-current lock-hold level.

The differential 10 provides control, power, traction, and off-road performance to a 4WD vehicle. Also, installation of the control system 56 does not require drilling or boring a hole through a dashboard of the 4WD vehicle; is not time-consuming, complicated, or costly; and does not damage the dashboard. The control system 56 integrates various controls into an efficient package and provides more safety and better control and feedback of status of the differential 10 relative to such systems of the related art. Furthermore, momentary "on/off" latching and drop-out power of the differential 10 is controlled. In addition, actuation of the differential 10 is prevented when 4WD functionality of the vehicle is not desired. In this way, premature wear of the differential 10 and related parts and an axle and corresponding tires of the 4WD vehicle is avoided. Moreover, since the differential 10 resets when power to the 4WD vehicle is turned off, the differential 10 helps provide longer life to a battery of the vehicle. The control system 56 can be a part of an aftermarket electronically-actuated-locking-differential system and employed with OEM applications as well.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. An electronically controlled locking differential comprising:
   an electromagnetic coil; and
   a control system adapted to control operation of said differential and including:
      a module adapted to be mounted under a dashboard of a vehicle; and
      a circuit electrically interfacing with said module and having:
         a latching switch that is electrically connected to at least one of first and second sources of power and adapted to provide latching power of said differential; and
         a latching component that is electrically connected to said latching switch and adapted to provide latching power of said differential;
         wherein said circuit is disabled when power to said control system is turned off and in "standby" mode when power to said control system is turned on and, upon said latching switch being activated, current flows through said circuit to activate said latching component and said differential is actuated.

2. An electronically controlled locking differential as set forth in claim 1, wherein said module includes a front panel and a rear panel that face a passenger compartment of the vehicle when said module is mounted under the dashboard.

3. An electronically controlled locking differential as set forth in claim 2, wherein said front panel of said module includes an "on/off" switch that is adapted to be manually pushed to activate/de-activate said differential momentarily so as to provide latching power of said differential; a plurality of LEDs that are adapted to indicate at least when a sensor detects that said differential is locked, said sensor does not detect that said differential is locked, and said control system detects an external fault or loss of continuity of said electromagnetic coil of said differential; and a plurality of displays that indicate at least amount of travel of said differential and amount of variable voltage being applied to said electromagnetic coil.

4. An electronically controlled locking differential as set forth in claim 2, wherein said rear panel of said module includes a potentiometer that is adapted to hold a particular level of voltage for said differential and be adjusted to various levels of potential and a connector that is adapted to act as an interface between said control system and the vehicle and has a plurality of pins each of which is designed to sense a particular electrical activity of the vehicle.

5. An electronically controlled locking differential as set forth in claim 1, wherein said latching component includes a double-pole, double-throw control relay that includes a first switch, a second switch, and a coil and, upon said latching switch being activated, current flows through said circuit to activate said relay, said second switch closes, and said differential is actuated.

6. An electronically controlled locking differential as set forth in claim 5, wherein said first switch includes a set of contacts for high current, said second switch includes a set of contacts for low current, and said coil is adapted to introduce a counter-EMF into said circuit when current changes.

7. An electronically controlled locking differential as set forth in claim 6, wherein said latching switch includes an "on" switch and an "off" switch, wherein upon said "on" switch being activated, current flows through said circuit to activate said relay, said second switch closes, and said differential is actuated.

8. An electronically controlled locking differential as set forth in claim 1, wherein said control system further includes at least one in-line diode that is adapted to conduct current to said relay and dampen a reverse-bias-voltage spike.

9. An electronically controlled locking differential as set forth in claim 1, wherein said control system further includes at least one resistor that is adapted to drop the amount of flow of current in said circuit.

10. An electronically controlled locking differential as set forth in claim 9, wherein said control system further includes at least one transistor that is adapted to transfer the current across at least one of said resistors.

11. A control system adapted to control operation of an electronically controlled locking differential, said control system comprising:
    a module adapted to be mounted under a dashboard of a vehicle; and
    a circuit electrically interfacing with said module and having:
       a latching switch that is electrically connected to at least one of first and second sources of power and adapted to provide latching power of the differential; and
       a latching component that is electrically connected to said latching switch and adapted to provide latching power of the differential;
       wherein said circuit is disabled when power to said control system is turned off and in "standby" mode when power to said control system is turned on and, upon said latching switch being activated, current flows through said circuit to activate said latching component and the differential is actuated.

12. An electronically controlled locking differential as set forth in claim 11, wherein said module includes a front panel and a rear panel that face a passenger compartment of the vehicle when said module is mounted under the dashboard.

13. An electronically controlled locking differential as set forth in claim 12, wherein said front panel of said module includes an "on/off" switch that is adapted to be manually pushed to activate/de-activate the differential momentarily so as to provide latching power of the differential; a plurality of LEDs that are adapted to indicate at least when a sensor detects that the differential is locked, said sensor does not detect that the differential is locked, and said control system detects an external fault or loss of continuity of the differential; and a plurality of displays that indicate at least amount of travel of the differential and amount of variable voltage being applied to the differential.

14. An electronically controlled locking differential as set forth in claim 12, wherein said rear panel of said module includes a potentiometer that is adapted to hold a particular level of voltage for the differential and be adjusted to various levels of potential and a connector that is adapted to act as an interface between said control system and the vehicle and has a plurality of pins each of which is designed to sense a particular electrical activity of the vehicle.

15. An electronically controlled locking differential as set forth in claim 11, wherein said latching component includes a double-pole, double-throw control relay that includes a first switch, a second switch, and a coil and, upon said latching switch being activated, current flows through said circuit to activate said relay, said second switch closes, and the differential is actuated.

16. An electronically controlled locking differential as set forth in claim 15, wherein said first switch includes a set of contacts for high current, said second switch includes a set of contacts for low current, and said coil is adapted to introduce a counter-EMF into said circuit when current changes.

17. An electronically controlled locking differential as set forth in claim 16, wherein said latching switch includes an "on" switch and an "off" switch, wherein upon said "on" switch being activated, current flows through said circuit to activate said relay, said second switch closes, and the differential is actuated.

18. An electronically controlled locking differential as set forth in claim 11, wherein said control system further includes at least one in-line diode that is adapted to conduct current to said relay and dampen a reverse-bias-voltage spike.

19. An electronically controlled locking differential as set forth in claim 11, wherein said control system further includes at least one resistor that is adapted to drop the amount of flow of current in said circuit.

20. An electronically controlled locking differential as set forth in claim 19, wherein said control system further includes at least one transistor that is adapted to transfer the current across at least one of said resistors.

* * * * *